May 30, 1972 — E. H. LACEY — 3,666,586
CORD REINFORCED HOSE SPLICING METHOD
Filed Nov. 10, 1970 — 2 Sheets-Sheet 1
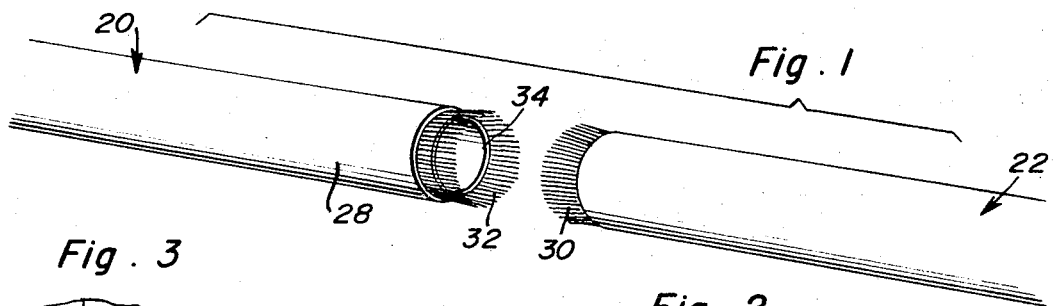
Fig. 1
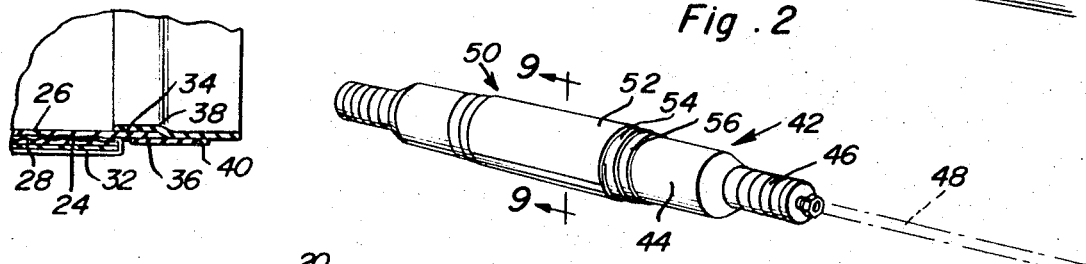
Fig. 3
Fig. 2
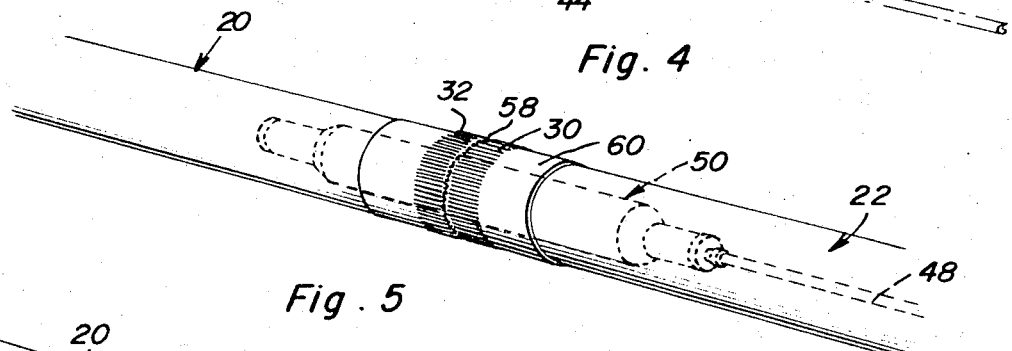
Fig. 4
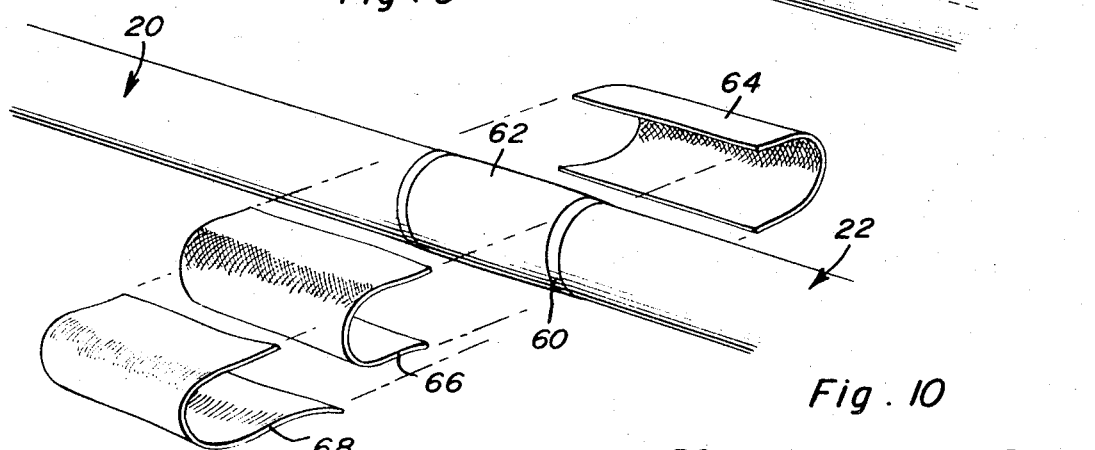
Fig. 5
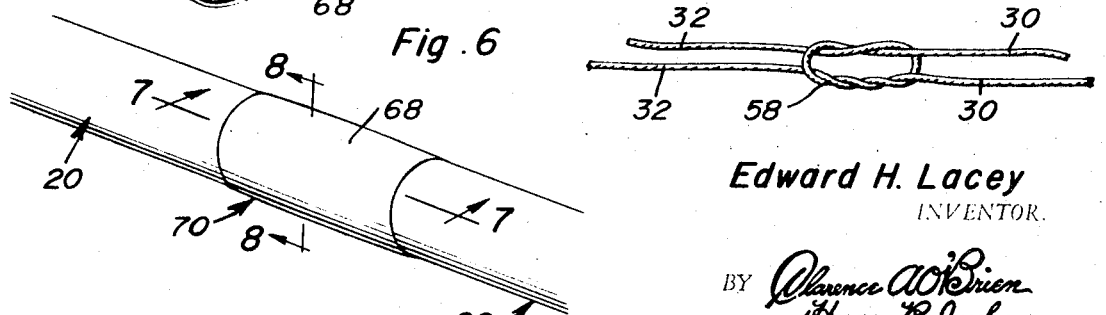
Fig. 6
Fig. 10
Edward H. Lacey
INVENTOR.
BY Clarence A. O'Brien
and Harvey B. Jacobson
Attorneys May 30, 1972   E. H. LACEY   3,666,586
CORD REINFORCED HOSE SPLICING METHOD
Filed Nov. 10, 1970   2 Sheets-Sheet 2
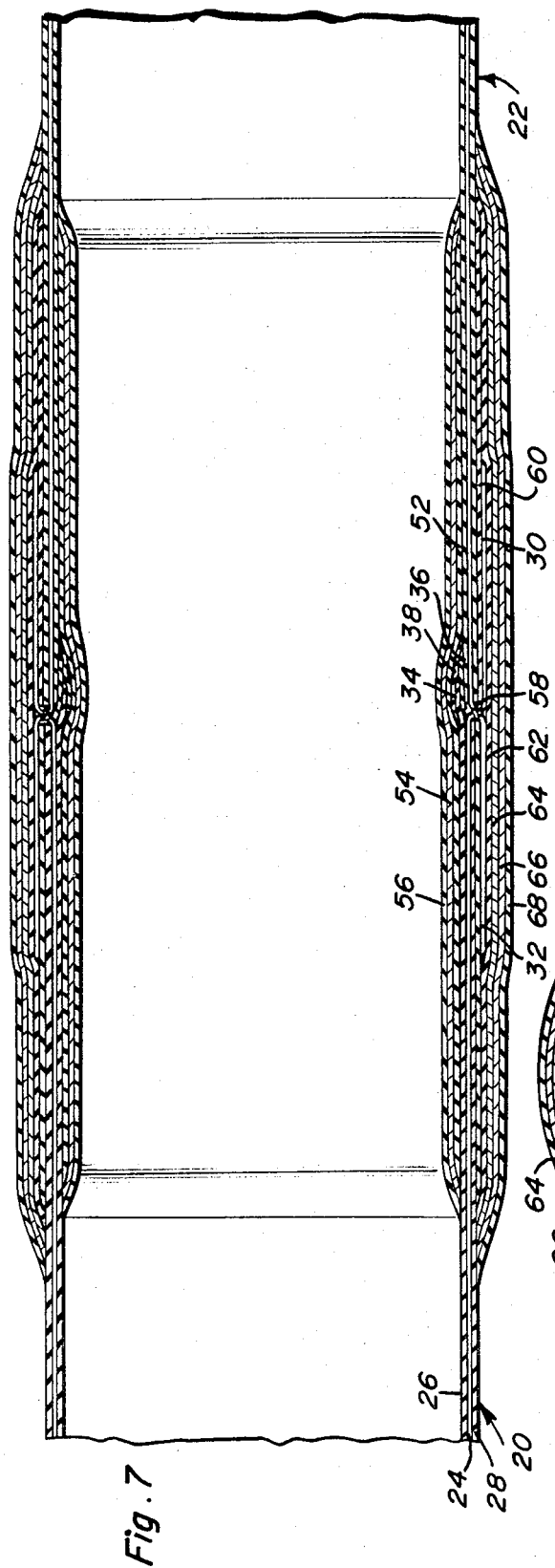
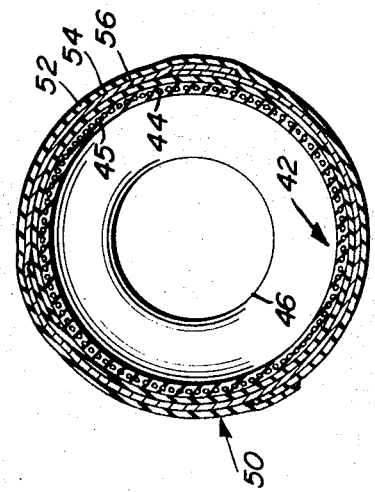
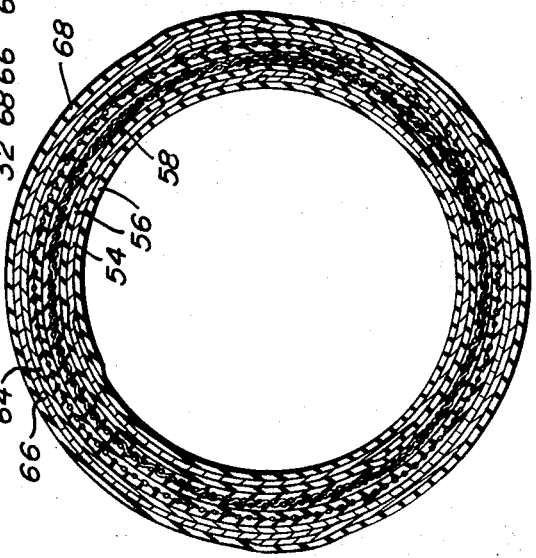
Edward H. Lacey
INVENTOR.
BY Clarence A. O'Brien
and Harvey B. Jacobson
Attorneys United States Patent Office 3,666,586
Patented May 30, 1972

3,666,586
CORD REINFORCED HOSE SPLICING METHOD
Edward H. Lacey, P.O. Box 796, Trent, S. Dak. 57065
Continuation-in-part of abandoned application Ser. No. 874, Jan. 6, 1970. This application Nov. 10, 1970, Ser. No. 88,420
Int. Cl. B32b 35/00
U.S. Cl. 156—98    6 Claims

ABSTRACT OF THE DISCLOSURE

A splice for cord reinforced hoses such as those employed in irrigation systems as a supply hose which is dragged along the supporting surface of an area being irrigated by the irrigation apparatus including an internal and external laminated splice assembly and a procedural step including the tying of the reinforcing cords employed in the hose by the use of non-slip knots to form a splice which is as strong as if not stronger than the original hose. An internal expansible balloon member is employed to place and retain the internal lamination in place and the external lamination is bonded in place with the curing step effectively vulcanizing the internal lamination and the external lamination to the hose to provide a seal for the splice. The internal expansible member includes a resilient tubular member of elongated construction reinforced by a plurality of parallel cords embedded therein. The method of forming the splice not only secures the reinforcing cords of the hose together by tying but also forms a reinforced sealing lamination on both the interior and exterior of the hose.

CROSS REFERENCE TO RELATED APPLICATION

This application is a continuation-in-part of my co-pending application Ser. No. 874, filed Jan. 6, 1970, now abandoned, for Method and Apparatus for Splicing Hose.

BACKGROUND OF THE INVENTION

Field of the invention

The present invention generally relates to the splicing of hoses and more particularly hoses which have cord reinforcement therein with the method and apparatus serving to provide a mechanical connection between the cord reinforcement by tying connecting knots therein and providing a reinforced seal laminated to and cured to both the interior and exterior of the hose.

Description of the prior art

One type of irrigation system presently being extensively used includes a wheeled unit having a discharge nozzle thereon receiving water from a supply through an elongated flexible hose connected with the wheeled unit. Such hoses may have a total length of 660 feet and may be constructed in various diameters such as a four or five inch diameter. The hose is dragged along the surface of the area being irrigated and when the hose is filled with water under pressure, substantial forces are exerted on the hose and damage to the hose occurs frequently. The hoses are necessarily retained flexible throughout their length for proper manipulation thereof such as by using a winching device, roller type pulleys over which the hose must pass at the end of the area being irrigated which substantially precludes the use of a rigid connecting joint being inserted as a connector in the hose. Patch type repairs either from the exterior or from the interior of the hose have been unsuccessful since conventional adhesive bonds employed with such patches have not successfully withstood the pressures and forces encountered during normal use of the hose.

As disclosed in my co-pending application, I have provided an internal expansible member which is inserted longitudinally into the hose and connected with an air line to enable expansion and contraction of the internal expansible member. The internal expansible member retains a laminated splice structure associated with the interior of a joint in the hose and an exterior laminated seal is provided to complete the splice with the splice being enclosed in a curing device incorporating heat and pressure which will effectively vulcanize both the internal lamination and the external lamination to the hose with the internal expansible member, in effect, serving as a curing bag during the curing operation. The apparatus and method disclosed in the co-pending application is incorporated herein by reference.

SUMMARY OF THE INVENTION

An object of the present invention is to provide a procedure and apparatus for splicing a hose having a cord reinforcement therein in which the cord reinforcement is exposed at the connected ends of the hoses and the cords are tied together with a non-slip knot thus effectively mechanically interconnecting the ends of the hose.

Another object of the invention is to provide a hose splicing procedure and apparatus in which an elongated internal expansible member is inserted into the hose in bridging relation to the joint with the internal expansible member including a laminated sealing and joining assembly thereon for association with the internal surface of the connected hoses whereby expansion of the internal expansible member will retain the laminated seal in tight engagement with the internal surface of the hoses during a vulcanizing operation to provide a reinforced laminated connection and seal interiorly of the hose connection.

A further object of the invention is to provide a hose splicing procedure and apparatus in which an external laminated seal and connecting assembly is applied to the hose and includes reinforcement to provide a laminated reinforced seal and connection externally of the hose when vulcanized thereto to provide an effective seal for the interior of the hose and for the exterior of the hose and at the same time provide a reinforcement to the connected portions of the hose.

Another important object of the present invention is to provide a hose splicing apparatus and method for splicing cord reinforced hoses which is relatively simple in operation but effective to securely join the hoses together and to seal the cord reinforcement from coming into contact with water which would permit the cord reinforcement to absorb water which would cause blistering of the hose thus providing a long lasting and dependable splice which is at least as strong as the original hose.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of the two adjacent ends of cord reinforced hoses prepared for splicing with the reinforcing cords exposed;

FIG. 2 is a perspective view of the internal expansible member or balloon with the internal lamination mounted thereon for insertion into the interior of the connected hoses;

FIG. 3 is a fragmental sectional view illustrating the application of narrow strips of sealing rubber attached to the projecting edge of the inner rubber layer of one of the hoses illustrating the association of the components thereof;

FIG. 4 is a perspective view of the connected hoses with the reinforcing cords being tied together with knots and the internal expansible member in position therein;

FIG. 5 is a perspective view of the external laminated seal and connecting assembly with certain of the components already installed and the remaining components exploded therefrom;

FIG. 6 is a perspective view of the completed splice;

FIG. 7 is a longitudinal, sectional view of the splice taken substantially along section line 7—7 of FIG. 6;

FIG. 8 is a transverse, sectional view taken substantially along section line 8—8 of FIG. 6;

FIG. 9 is a transverse, sectional view of the expansible member taken substantially along section line 9—9 of FIG. 2; and FIG. 10 is a plan view illustrating the non-slip knot employed for securing the reinforcing cords together.

DESCRIPTION OF THE DRAWINGS

Referring now more specifically to the drawings, the two hose sections illustrated are generally designated by numerals 20 and 22 in which the hoses or hose sections are of conventional construction and when a rupture has occurred in a hose, the ruptured or damaged section is removed by cutting the hose transversely with the thus formed ends being spliced together by employing the present invention. As illustrated in FIG. 3, the hose which is of conventional construction includes a cord reinforcement layer 24 sandwiched between, bonded to and embedded into an inner rubber layer 26 and an outer rubber layer 28 which provides a conventional cord reinforced hose. In preparing the hose 22, the inner layer 26 and outer layer 28 of rubber are removed thus providing exposed reinforcing cords 30 with the length of the cords 30 being several inches, such as three inches or the like, to facilitate the tying of the cords 30 with corresponding cords 32 on the hose 20. The hose 20 is prepared slightly different from the hose 22 in that the outer layer 28 is removed for the same distance as in the hose 22 but the inner layer 26 is left projecting beyond the end of the outer layer 28 as illustrated in FIGS. 1 and 3 with this projecting end portion of the inner layer 26 being designated by numeral 34.

Mounted exteriorly on the projecting edge 34 is a narrow strip of rubber 36 which overlaps the edge 34 and projects beyond the edge 34 as illustrated in FIG. 3. A similar but slightly wider strip 38 of rubber is disposed against the interior surface of the edge 34 and projects outwardly therebeyond and is bonded to the strip 38 as at 40 and both of the strips 36 and 38 are bonded to the projecting edge 34. As illustrated, the strip 38 is slightly wider than the strip 36 and provides sealing engagement with the projecting end edge 34 of the inner rubber layer 26 of the hose 20 thus forming, in effect, a continuation thereof. The strips 36 and 38 may be of uncured rubber or the like and will be bonded to the edge 34 by their natural adhesion.

An internal expansible member generally designated by the numeral 42 bridges the juncture between hoses 20 and 22 with the expansible member 42 including an elongated cylindrical inflatable and deflatable body 44 having end closure plugs 46 secured thereto by suitable clamping devices or the like. One end plug 46 is connected with an air line or pipe 48 which is approximately 330 feet in length. The expansible member 42 is peripherally collapsed and inserted into the end of one of the hoses 20 and 22 at the junction thereof before they are connected and the air line 48 is then inserted into the end of the other hose and connected to plug 46. The air line 48 is used to remove the inflatable member after the splice has been completed. Mounted on the exterior of the expansible member 42 is an internal seal and connecting assembly 50 which includes a layer of rubber 52, a layer of fabric impregnated with rubber 54 and a layer 56 of rubber with the layers 52, 54 and 56 being progressively slightly longer for forming a tapered and relatively smooth interior surface for the hose. The laminated assembly 50 bridges the juncture between the hoses 20 and 22 with the hose 22 being telescoped over the strip 38 and the strip 36 as well as the edge 34 and into abutting engagement with the edge of the outer layer 28 so that the inner surface of the hose 22 will actually be sealed with the strip 36 and the strip 38 as well as the lamination 50 when the assembly is vulcanized.

The cords 30 and 32 are tied together by non-slip knots as at 58 and are disposed in overlying relation to a rubber sleeve 60 placed on each of the hoses 20 and 22 in underlying relation to the free ends of the tied cords 30 and 32 which provides the structure in the condition illustrated in FIG. 4. Thereafter, a layer of rubber 62 overlies the cords 30 and 32 and the rubber layer 60. Positioned over the rubber layer 62 is a rubber impregnated fabric layer 64 and an optional second layer 66 identical to the layer 64 and an outer layer of rubber 68 all of which progressively increase in length to provide for a tapering construction to the splice joint to provide a relatively smooth external splice connection as illustrated in FIG. 6 and generally designated by the numeral 70.

After assembly of the internal expansible member 42 and the external connecting and sealing assembly, the splice connection is cured or vulcanized under predetermined heat and pressure conditions by employing a steam chest or other similar curing device such as disclosed in my co-pending application. The expansible member 42 is, of course, inflated to a predetermined pressure and the curing and vulcanizing of the rubber layers under pressure will provide a seal for both the interior and exterior of the hose and the fabric impregnated layers will provide additional cord reinforcement for the hose so that the tying together of the cords 30 and 32 and the internal and external rubber impregnated fabric layers will effectively provide a splice with the same or greater strength characteristics than the original hose.

The longitudinal section and transverse section of the splice illustrated in FIGS. 7 and 8 show the orientation of the various components when in their final vulcanized position. While the drawings have been somewhat exaggerated to illustrate the different layers and their relationships, it is pointed out that when the vulcanizing and curing procedure is completed, the various layers are actually indistinguishable from each other inasmuch as the rubber materials flow into, and encircle or embed the reinforcement materials.

The internal expansible member 42 is provided with an elongated resilient body 44 constructed of rubber material having longitudinal reinforcing cords 45 therein which limit the degree of ballooning and elongation of the elongated inflatable member. This also sustains the uninflated shape of the member so that the lamination assembly 50 may be positioned thereon and the entire assembly then collapsed by reducing the circumferential extent thereof to facilitate its insertion into the hoses. While the rubber body of the elongated member operates effectively, if desired, an elongated inner tube may be provided for assuring that air will not leak from the expansible member.

FIG. 10 illustrates the knot 58 which basically is a square knot with an extra loop formed in the initially formed side of the square knot. This type of knot will not slip.

The foregoing is considered as illustrative only of the principles of the invention. Further since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. The method of splicing the ends of cord reinforced rubberhose sections consisting of the steps of removing covering material for the reinforcing cords for a predetermined distance on the ends of the hose sections to be joined thus leaving exposed cords, positioning an interior lamination in the end of one hose having exposed cords, positioning the hose sections to be joined in end-to-end adjacent relation in telescoping relation to the interior lamination, tying the exposed reinforcing cords together with non-slip knots, positioning an exterior lamination around the joined hoses in bridging relation to the juncture between the hoses, and vulcanizing the laminations to the hoses for sealing and joining the hoses.

2. The method as defined in claim 1 wherein the step of removing the coating material from the ends of the hose sections includes the provision of leaving a longitudinally projecting inner layer of rubber material on one of the hose sections for telescopic engagement with the other section, and positioning a narrow strip of sealing rubber material around the inner periphery and outer periphery of the longitudinal projection with the strips projecting beyond the longitudinal projection and being secured together and sealed to the inner surface of the other hose section thereby providing an effective seal for the interior of the hose to prevent the cord reinforcement in the hose from coming into contact with water being carried by the hose.

3. The method as defined in claim 2 wherein said step of tying includes the positioning of the free ends of the cords along the external surface of the hose sections for bonding thereto when applying the exterior lamination thereby providing additional reinforcement to the hose.

4. The method as defined in claim 1 wherein the step of positioning the interior lamination includes the step of placing a layer of rubber on the exterior surface of an elongated inflatable member, placing a layer of rubber impregnated fabric on the layer of rubber, placing a layer of rubber on the fabric layer, peripherally collapsing the inflatable member and inserting it longitudinally into the end of one hose section with substantially one half of the length of the layers projecting therefrom.

5. The method as defined in claim 1 wherein the step of positioning the exterior lamination includes the step of placing a layer of rubber around the exposed cords, placing at least one layer of rubber impregnated fabric on the layer of rubber, and placing an external layer of rubber on the fabric layer.

6. The method as defined in claim 3 wherein the step of positioning the interior lamination includes the step of placing a layer of rubber on the exterior surface of an elongated inflatable member, placing a layer of rubber impregnated fabric on the layer of rubber, placing a layer of rubber on the fabric layer, peripherally collapsing the inflatable member and inserting it longitudinally into the end of one hose section with substantially one half of the length of the layers projecting therefrom, the step of positioning the exterior lamination including the step of placing a layer of rubber around the exposed cords, placing at least one layer of rubber impregnated fabric on the layer of rubber, and placing an external layer of rubber on the fabric layer.

References Cited
UNITED STATES PATENTS

| | | | |
|---|---|---|---|
| 3,022,209 | 2/1962 | Campbell | 156—158 |
| 3,382,121 | 5/1968 | Sherlock | 156—294 |
| 3,389,046 | 6/1968 | Burress | 156—294 |

ROBERT F. BURNETT, Primary Examiner

L. KOECKERT, Assistant Examiner

U.S. Cl. X.R.

92—261; 138—155; 156—156, 158, 159, 294, 304